US006794666B2

(12) United States Patent
Choi et al.

(10) Patent No.: US 6,794,666 B2
(45) Date of Patent: Sep. 21, 2004

(54) ELECTRON EMISSION LITHOGRAPHY APPARATUS AND METHOD USING A SELECTIVELY GROWN CARBON NANOTUBE

(75) Inventors: Won-bong Choi, Suwon (KR); In-kyeong Yoo, Suwon (KR)

(73) Assignee: Samsugn Electronics Co., Ltd., Kyungki-do (KR)

( * ) Notice: Subject to any disclaimer, the term of this patent is extended or adjusted under 35 U.S.C. 154(b) by 107 days.

(21) Appl. No.: 10/160,102

(22) Filed: Jun. 4, 2002

(65) Prior Publication Data

US 2002/0182542 A1 Dec. 5, 2002

(30) Foreign Application Priority Data

Jun. 4, 2001  (KR) ......................................... 2001-31125

(51) Int. Cl.[7] .............................. G21G 5/00; G21K 5/10
(52) U.S. Cl. ................... 250/492.24; 250/492.3
(58) Field of Search ..................... 250/492.24, 492.3, 250/423 F

(56) References Cited

U.S. PATENT DOCUMENTS 6,129,901 A * 10/2000 Moskovits et al. ...... 423/447.3
6,278,231 B1 * 8/2001 Iwasaki et al. ............. 313/310
6,512,235 B1 * 1/2003 Eitan et al. ............... 250/423 F
6,628,053 B1 * 9/2003 Den et al. .................... 313/310

FOREIGN PATENT DOCUMENTS

| JP | 56-40832 | 4/1981 |
| KR | 1999-43770 | 6/1999 |
| KR | 1999-73591 | 10/1999 |

* cited by examiner

*Primary Examiner*—Jack Berman
*Assistant Examiner*—Kalimah Fernandez
(74) *Attorney, Agent, or Firm*—Lee & Sterba, P.C.

(57) ABSTRACT

An electron emission lithography apparatus and method using a selectively grown carbon nanotube as an electron emission source, wherein the electron emission lithography apparatus includes an electron emission source installed within a chamber and a stage, which is separated from the electron emission source by a predetermined distance and on which a sample is mounted, and wherein the electron emission source is a carbon nanotube having electron emission power. Since a carbon nanotube is used as an electron emission source, a lithography process can be performed with a precise critical dimension that prevents a deviation from occurring between the center of a substrate and the edge thereof and may realize a high throughput.

3 Claims, 6 Drawing Sheets

ELECTRON EMISSION LITHOGRAPHY APPARATUS AND METHOD USING A SELECTIVELY GROWN CARBON NANOTUBE

BACKGROUND OF THE INVENTION

1. Field of the Invention

The present invention relates to an electron emission lithography apparatus and method using a selectively grown carbon nanotube. More particularly, the present invention relates to an electron emission lithography apparatus and method in which a selectively grown carbon nanotube is used as an electron emission source in order to perform nano-patterning and a track of an electron is precisely controlled using a magnetic field.

2. Description of the Related Art

Lithography is a technique of transferring a pattern of a mask onto a thin resist formed on a surface of a substrate, such as a semiconductor wafer. Generally, lithography can be divided into two types, optical lithography and radiation lithography. Optical lithography indicates ultraviolet (UV) lithography and radiation lithography indicates lithography using an X-ray, electron beam (e-beam), or ion beam.

Using conventional optical lithography, it is difficult to achieve a precise critical dimension of 70 nm or less. In the case of electron beam lithography, a deviation occurs between the center of a substrate and the edge thereof due to the characteristics of the electron beam. Thus, it is necessary to perform electron beam lithography on a single substrate many times in order to reduce the deviation. Resultantly, a throughput of a lithography apparatus is reduced significantly.

SUMMARY OF THE INVENTION

In an effort to solve the above-described problems, it is a feature of an embodiment of the present invention to provide an electron emission lithography apparatus and method using a selectively grown carbon nanotube as an electron emission source for lithography to control a critical dimension precisely, to prevent occurrence of a deviation throughout a sample, which is an object of lithography, and to increase throughput.

To provide this feature of the present invention, an embodiment of the present invention provides an electron emission lithography apparatus including an electron emission source installed within a chamber and a stage, which is separated from the electron emission source by a predetermined distance and on which a sample is mounted, wherein the electron emission source is a carbon nanotube having electron emission power.

Preferably, the electron emission source is manufactured by forming a carbon nanotube in a porous substrate, and preferably, the porous substrate includes Si or $Al_2O_3$.

Also preferably, the electron emission lithography apparatus further includes a magnetic field generator that can apply a magnetic field to electrons emitted from the carbon nanotubes and an insulator thin film patterned on the carbon nanotube.

Another feature of an embodiment of the present invention provides an electron emission lithography method using a carbon nanotube. The electron lithography method includes (a) applying voltage to a substrate having a carbon nanotube to emit electrons from the carbon nanotube; (b) controlling the emitted electrons to reach a position corresponding to the carbon nanotube on a sample; and (c) performing lithography on an electron beam resist formed on the sample by the electrons.

In an embodiment of the present invention, (b) may be performed by applying a magnetic field to the emitted electrons using a magnetic field generator. Alternatively, (b) may be performed by controlling the intensity of the magnetic field applied to the electrons according to the distance between the carbon nanotube and the electron beam resist on the sample.

Another feature of an embodiment of the present invention provides a method of manufacturing an electron emitter for lithography. The method includes (a) forming nano templates for forming carbon nanotubes by performing anodizing on a substrate; (b) growing carbon nanotubes in the nano templates by injecting a carbon nanotube growing gas; and (c) forming a nonconductive layer on predetermined portions of the carbon nanotubes.

Preferably, (a) includes forming holes at positions where the carbon nanotubes are to be grown by performing a first anodizing process; and forming the nano templates for growing the carbon nanotubes at the positions of the holes by performing a second anodizing process.

Preferably, in (b) the growing gas is methane and (b) additionally includes injecting a diluent gas, such as argon or nitrogen.

Yet another feature of an embodiment of the present invention provides a method of manufacturing an electron emitter for lithography. The method includes (a) selectively forming nano templates for forming carbon nanotubes in a substrate by performing anodizing on the substrate; and (b) growing carbon nanotubes in the nano templates formed at selected positions by injecting a carbon nanotube growing gas into the substrate.

BRIEF DESCRIPTION OF THE DRAWINGS

The above and other features and advantages of the present invention will become more apparent to those of ordinary skill in the art upon review of the detailed description of preferred embodiments of the present invention that follows with reference to the attached drawings in which.

DETAILED DESCRIPTION OF THE INVENTION

Korean Patent Application No. 2001-31125, filed on Jun. 4, 2001, and entitled: "Electron Emission Lithography Apparatus and Method Using Selectively Grown Carbon Nanotube," is incorporated by reference herein in its entirety.

Figure 1:
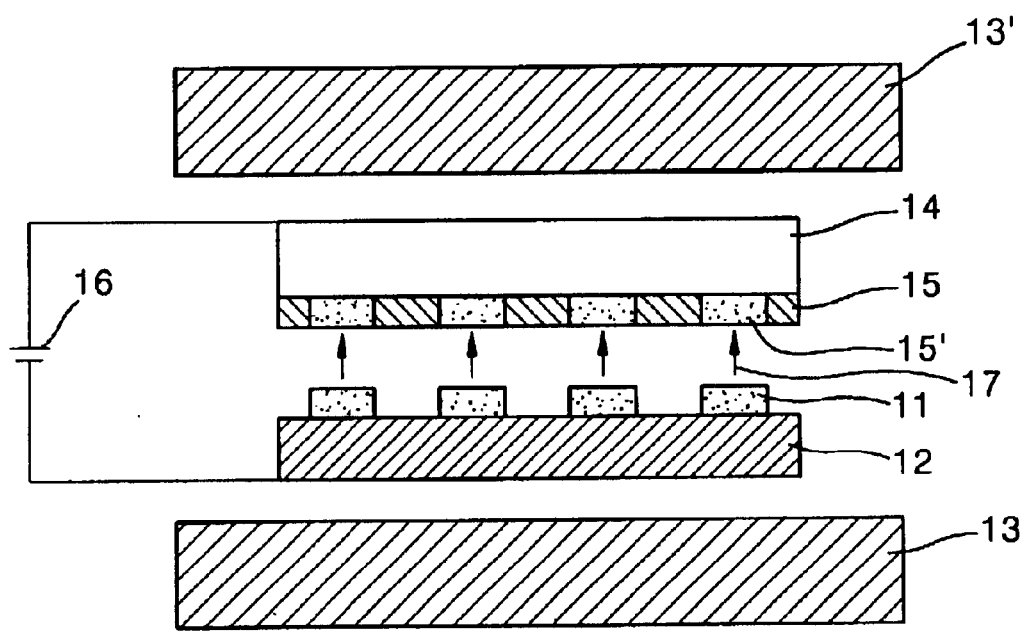
FIG. 1 illustrates a sectional view of an electron emission lithography apparatus using a carbon nanotube as an electron emission source according to an embodiment of the present invention.

FIG. 1 illustrates a sectional view of an electron emission lithography apparatus using a carbon nanotube as an electron emission source according to an embodiment of the present invention. The structure of the electron emission lithography apparatus using a selectively grown carbon nanotube as an electron emission source according to an embodiment of the present invention will now be described.

A sample 14, on which an e-beam resist 15 to be patterned is formed, is disposed above and a predetermined distance apart from a substrate 12, on which carbon nanotubes 11 acting as electron emission sources are formed, within a chamber. The substrate 12 and the sample 14 are positioned between magnetic field generators 13 and 13' for controlling the paths of electrons emitted from the carbon nanotubes 11. A voltage apply unit 16, which applies voltage to emit electrons from the carbon nanotubes, is provided separately.

The magnetic field generators 13 and 13' are designed to precisely control a magnetic field according to the distance between the carbon nanotubes 11 and the sample 14 to be patterned so that the electrons 17 emitted from the carbon nanotubes 11 can reach corresponding positions on the sample 14.

The following description relates to an electron emission lithography method using a carbon nanotube as an electron emission source. As shown in FIG. 1, if voltage is applied from the voltage apply unit 16 to each of the carbon nanotubes 11, an electron 17 is emitted from the tip of the carbon nanotube 11. Here, the emitted electron 17 must reach a desirable position 15' on the sample 14 on which the e-beam resist 15 is formed. A track of the movement of the electron 17 emitted from the carbon nanotube 11 is controlled by a magnetic field precisely controlled by the magnetic field generators 13 and 13'. The electron 17 spirals one time and reaches a desirable position 15' on the surface of the sample 14 coated with the e-beam resist 15.

In other words, the electron 17 emitted from the carbon nanotube 11 reaches a predetermined position 15', which corresponds to the carbon nanotube 11 on the sample 14 coated with the e-beam resist 15, due to a magnetic field. Consequently, the shape of the carbon nanotube 11 formed on the substrate 12 can be projected upon the sample 14. Accordingly, a lithography process is performed on the sample 14 in a desired pattern. Thereafter, if a developing process is performed, portions of the e-beam resist 15 exposed to an electron beam (i.e., 15') remain when the e-beam resist 15 is negative, while portions of the e-beam resist 15 not exposed to an electron beam remain when the e-beam resist 15 is positive.

Figure 2A:
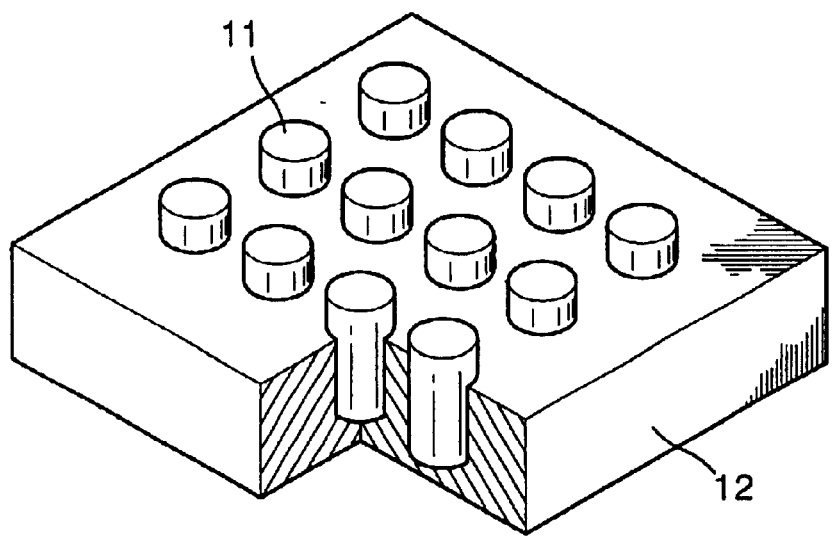
FIGS. 2A and 2B illustrate perspective views of two embodiments of an electron emitter formed by selectively growing carbon nanotubes using nano templates and patterning them in a desired shape in an electron emission lithography apparatus using a carbon nanotube as an electron emission source according to the present invention.
Figure 2B:
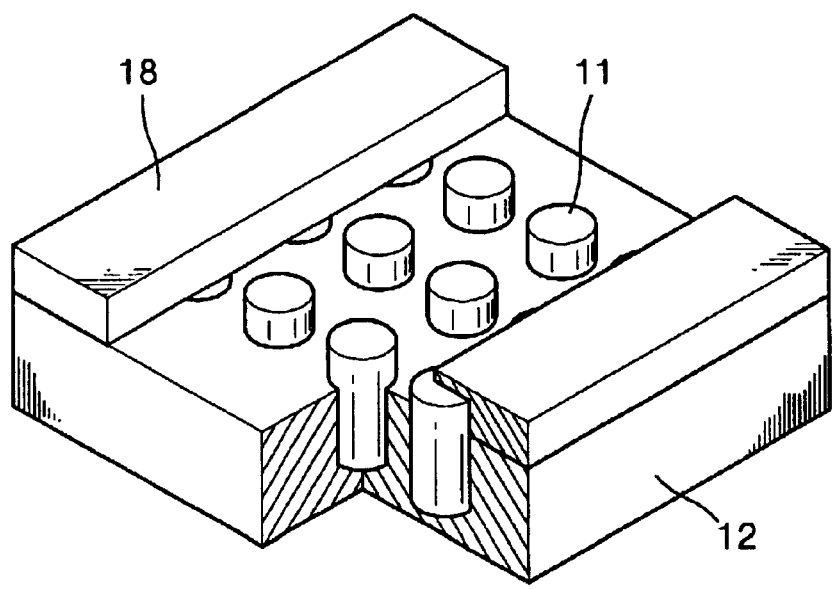

FIGS. 2A and 2B illustrate perspective views of two embodiments of an electron emitter formed by selectively growing carbon nanotubes using nano templates and patterning them in a desired shape in an electron emission lithography apparatus using a carbon nanotube as an electron emission source according to the present invention. In FIG. 2A, carbon nanotubes 11 are selectively grown from desired portions on a porous substrate 12. In FIG. 2B, an insulator thin film 18 is deposited on the top portions of the carbon nanotubes 11 grown on the substrate 12 in order to emit electrons from the carbon nanotubes 11 in a desired pattern.

Figure 3A:
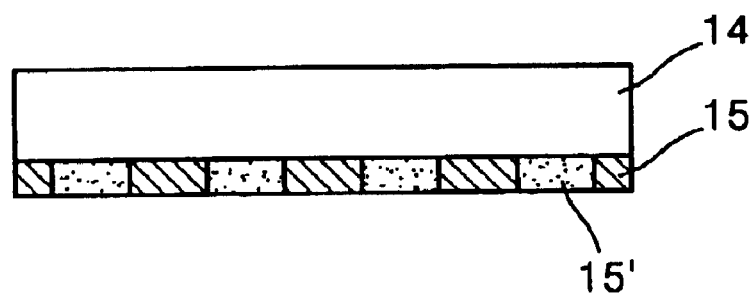
FIGS. 3A and 3B illustrate an electron emission lithography method using a carbon nanotube as an electron emission source, according to an embodiment of the present invention, in which a resist formed on a sample is exposed to an electron beam and then developed and patterned.
Figure 3B:
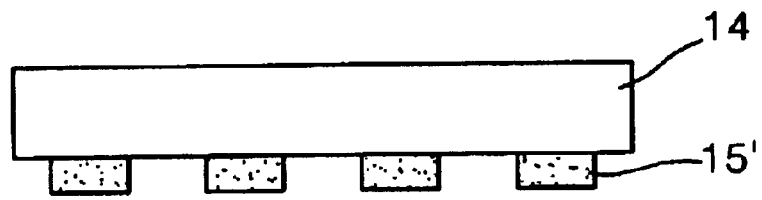

FIGS. 3A and 3B illustrate an electron emission lithography method using a carbon nanotube as an electron emission source according to an embodiment of the present invention. In FIGS. 3A and 3B, electron beams have reached the desired position of an e-beam resist 15', and the desired positions of the e-beam resist 15' have been developed and patterned. In this case, the e-beam resists 15 and 15' are negative. Alternatively, if the e-beam resists 15 and 15' were positive, the exposed e-beam resist 15' would be removed, as described above.

A method of manufacturing an electron emission lithography array using a selectively grown carbon nanotube as an electron emission source according to the present invention will be described with reference to FIGS. 4A through 4E. FIGS. 4A through 4E illustrate the steps of a manufacturing process of the electron emission lithography array according to an embodiment of the present invention.

Figure 4A:
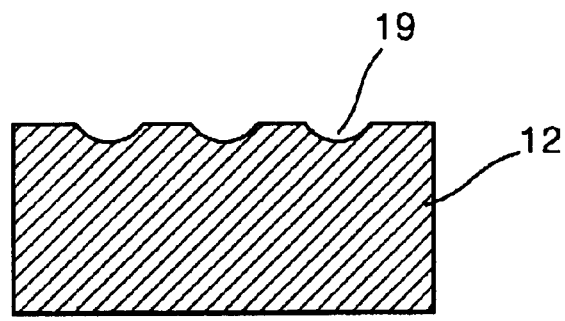
FIGS. 4A through 4E illustrate steps of a manufacturing process of an electron emission lithography array using a carbon nanotube as an electron emission source according to an embodiment of the present invention.

Holes 19 are formed at positions where carbon nanotubes 11 are to be grown in a substrate 12 by an anodizing process. As shown in FIG. 4A, a first anodizing process is performed on the substrate 12, for example, an aluminum (Al) substrate. As a result, the holes 19 where the carbon nanotubes 11 are to be grown are formed in the substrate 12.

Figure 4B:
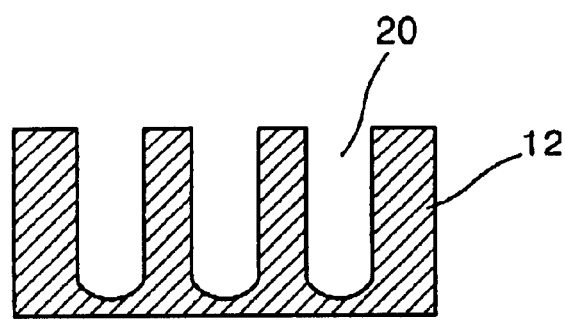

Next, as shown in FIG. 4B, a second anodizing process is performed to deepen the holes 19, thereby forming nano templates 20. The nano templates 20 define positions where the carbon nanotubes 11 are to grow and preferably have a diameter of about 1000 nm or less. After the first and second anodizing processes are completed, the Al substrate is oxidized into $Al_2O_3$.

Figure 4C:
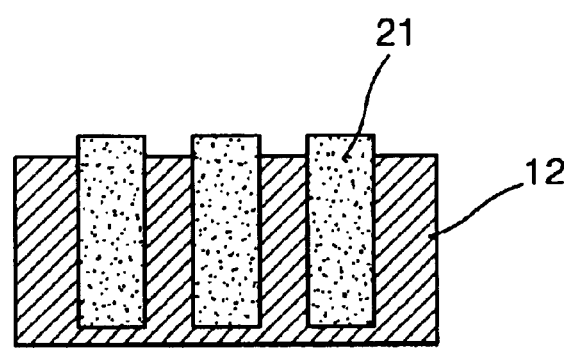

Next, as shown in FIG. 4C, a carbon nanotube growth gas 21 is injected into the substrate 12 having the nano templates 20, thereby growing the carbon nanotubes 11. Preferably, methane is used as the carbon nanotube growing gas, and preferably, argon or nitrogen gas is used as a diluent gas.

Figure 4D:
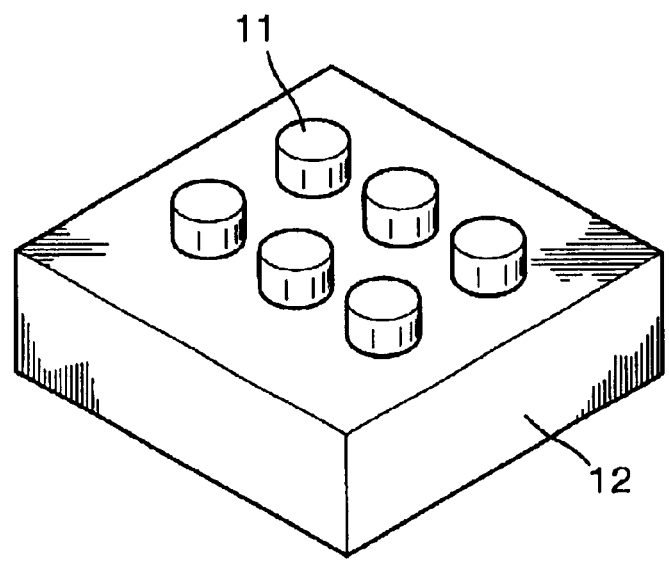
Figure 4E:
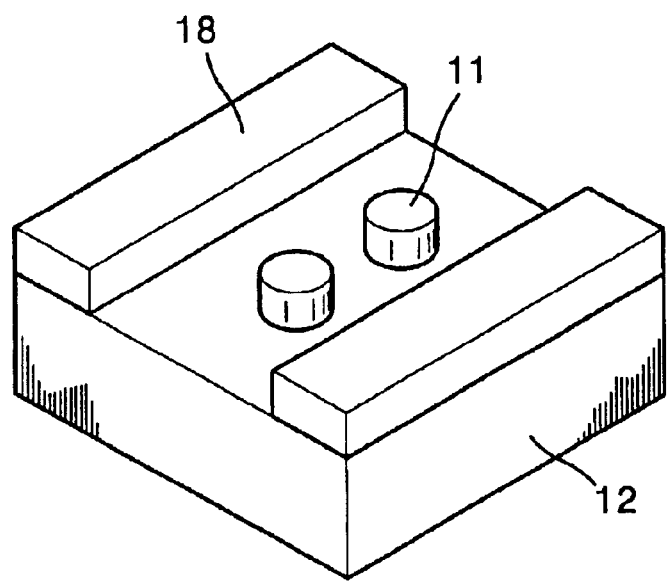

As shown in FIG. 4D, the carbon nanotubes 11 can be grown in a desired pattern and directly used as electron emission sources. Alternatively, as shown in FIG. 4E, a nonconductive layer 18, for example, an $SiO_2$ layer, is formed on the substrate 12 having the grown carbon nanotubes 11 and is patterned using an electron beam to have a desired pattern.

Figure 5A:
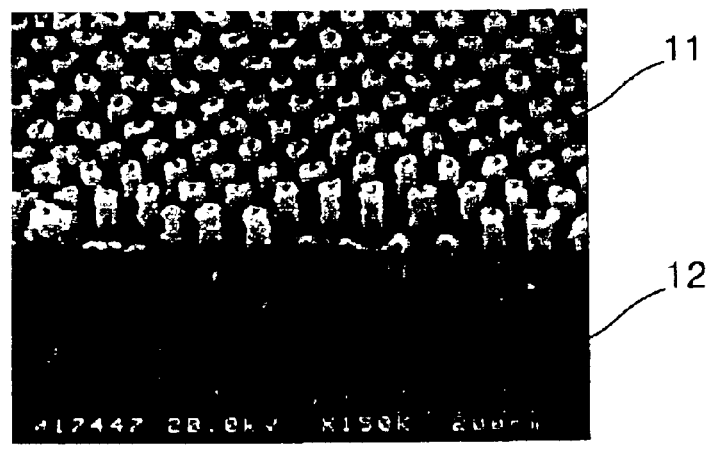
FIGS. 5A through 5B are transmission electron microscope (TEM) photos of carbon nanotube electron emission arrays formed by growing carbon nanotubes as electron emission sources in an electron emission source according to an embodiment of the present invention.
Figure 5B:
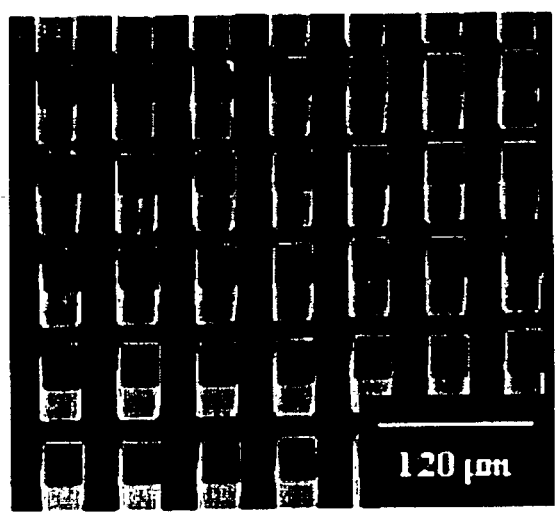

FIGS. 5A and 5B are transmission electron microscope (TEM) photos of carbon nanotube electron emission arrays formed by vertically growing carbon nanotubes 11 as electron emission sources in the substrate 12 according to the method illustrated by FIGS. 4A through 4E using an electron emission lithography apparatus according to the present invention. A carbon nanotube electron emission array can be very precisely manufactured through the above-described process.

As described above, according to the present invention, since carbon nanotubes are used as electron emission sources, a lithography process can be performed with a precise critical dimension. In addition, since electrons emitted from carbon nanotubes depreciate portions of an e-beam resist corresponding to the carbon nanotubes, a deviation between the center of a substrate and the edge thereof can be prevented.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electron emission lithography apparatus comprising:
   an electron emission source, which is a carbon nanotube formed in a porous substrate, installed within a chamber;
   a stage, which is separated from the electron emission source by a predetermined distance and on which a sample is mounted, wherein the electron emission source has electron emission power;
   a magnetic field generator, which can apply a magnetic field to electrons emitted from the carbon nanotube and control paths of electrons emitted from the carbon nanotube so that the electrons reach predetermined positions of an electron beam resist on the sample; and
   an insulator thin film patterned on the carbon nanotube.

2. The electron emission lithography apparatus as claimed in claim 1, wherein the porous substrate comprises Si or $Al_2O_3$.

3. An electron emission lithography method using a carbon nanotube, comprising:
   (a) applying voltage to a substrate having a carbon nanotube to emit electrons from the carbon nanotube;
   (b) controlling the emitted electrons to reach a position corresponding to the carbon nanotube on a sample by applying a magnetic field to the emitted electrons using a magnetic field generator and by controlling the intensity of the magnetic field applied to the electrons according to the distance between the carbon nanotube and an electron beam resist on the sample; and
   (c) performing lithography on the electron beam resist formed on the sample by the electrons.

* * * * *